United States Patent
Bril et al.

(10) Patent No.: US 7,107,590 B2
(45) Date of Patent: Sep. 12, 2006

(54) METHOD OF AND SYSTEM FOR DETERMINING A BEST-CASE RESPONSE TIME OF A PERIODIC TASK

(75) Inventors: Reinder Jaap Bril, Eindhoven (NL); Elisabeth Francisca Maria Steffens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 746 days.

(21) Appl. No.: 10/008,195

(22) Filed: Nov. 8, 2001

(65) Prior Publication Data

US 2002/0120488 A1    Aug. 29, 2002

(30) Foreign Application Priority Data

Nov. 9, 2000    (EP)    .................................. 00203904

(51) Int. Cl.
*G06F 9/44* (2006.01)
*G06F 9/46* (2006.01)
(52) U.S. Cl. ...................................... 718/103; 718/102
(58) Field of Classification Search ......... 718/100–108
See application file for complete search history.

(56) References Cited

U.S. PATENT DOCUMENTS

| 6,110,220 A * | 8/2000 | Dave et al. ..................... 716/3 |
| 2002/0120661 A1 * | 8/2002 | Binns et al. ................ 709/102 |

OTHER PUBLICATIONS

Kim, Taewoong et al. "Best Case Response Time Analysis for Improved Schedulability Analysis of Distributed Real-Time Tasks." Apr. 2000.*
Kim, Namyun. "A Scheduling Technique for Real-time Systems with End-to-End Timing Constraints." IEEE. 1996.*
Gutierrez, J.C. et al. "Best-Case Analysis for Improving the Worst-Case Schedulability Test for Distributed Hard Real-Time Systems." Jun. 1998.*
Palencia, J.C. et al. "Schedulability Analysis for Tasks with Static and Dynamic Offsets." IEEE. Dec. 4, 1998.*
Nilsen, Kelvin D. et al. "Worst-Case Execution Time Analysis on Modern Processors." ACM. Nov. 1995.*
Jeffay, Kevin et al. "On Non-Preemptive Scheduling of Periodic and Sporadic Tasks." IEEE. Dec. 1991.*
Lee, Chang-Gun et al. "Enhanced Analysis of Cache-related Preemption Delay in Fixed-priority Preemptive Scheduling." 1997.*

* cited by examiner

*Primary Examiner*—Lewis A. Bullock, Jr.
(74) *Attorney, Agent, or Firm*—Michael E. Belk (57) ABSTRACT

A method of determining a best-case response time of a first periodic task, the method comprising a first step based upon Rate Monotonic Analysis of determining the priorities of the tasks that have to be scheduled on a system. In order to determine whether the set of tasks can be scheduled on the system, the best-vase response time in addition to the worst-case response time is determined per task. This best-case response time is substantially equal to the difference between the start of a task with a lower priority and the completion of this low priority task, the start being right after the release of the low priority task and the completion coinciding with the simultaneous release all higher priority tasks.

17 Claims, 4 Drawing Sheets

METHOD OF AND SYSTEM FOR DETERMINING A BEST-CASE RESPONSE TIME OF A PERIODIC TASK

The invention relates to a method of determining a best-case response time of a first periodic task, the method comprising a first step of determining that the first periodic task has a lower priority than a higher priority of a second periodic task.

Furthermore, an embodiment relates to a system of determining a best-case response time of a first periodic task, the system comprising determination means conceived to determine that the first periodic task has a lower priority than a higher priority of a second periodic task.

Furthermore, another embodiment relates to a computer program product arranged to perform the method of determining a best-case response time of a first periodic task.

Another embodiment relates to a storage device, a television set and a set-top box.

An embodiment of the method and system of the kind set forth above is known from the article "Best-Case Analysis for improving the Worst-Case Schedulability Test for Distributed Hard Real-Time Systems" (Proceedings of the 10th EuroMicro Workshop on Real-Time systems, Berlin 1998, pages 35 to 44). Here, a best-case analysis technique is disclosed that is based upon Rate Monotonic Analysis (RMA). RMA is a mathematical technique to specify, understand, analyze and predict the timing behavior of real-time software systems in which tasks are scheduled by fixed priority. The disclosed best-case analysis technique is based upon an estimation of a lower bound on the best-case response times of different tasks in the system. The lower bound can be estimated by two methods. The first method does not take preemption of a lower priority task by higher priority tasks into account. The second method is an iterative method that takes into account some of the preemption effects caused by higher priority tasks. Within these methods, it is assumed that a task with a lower priority is activated immediately after all higher priority tasks complete their execution.

An embodiment provides a method that derives a tighter lower bound on the best-case response time of a task. To achieve this object, another embodiment is characterized in a second step of determining that the best-case response time of the first periodic task is substantially equal to the difference between a start of the first periodic task right after its release and a completion of the first periodic task that coincides with a release of the second periodic task. By using this instant to determine the best-case response time, the number of preemptions of the first periodic task by higher periodic tasks, such as the second periodic task, can be minimized. Furthermore, the execution time of the first periodic task can be minimized. The best-case response time can be used within distributed systems wherein the output of a triggering task running on a system or processor is the input of an other, following, task running on an other system or an other processor. Then, the jitter or time variation in the completion of the triggering task results in a release jitter of the following task, which in turn has an effect on the worst-case response times of tasks that are triggered by the following task. Therefore, the instant enables an improvement of the resource utilization of a system. Since tasks use resources of a real-time system or a distributed real-time system, and these real-time resources are finite, the number of schedulable tasks is amongst others determined by their worst-case response times and best-case response times. When a worst-case response time or best-case response time of a task exceeds a deadline of that task, the task cannot be scheduled. Tasks that cannot be scheduled do not use resources of a system, which may result in a smaller resource utilization of the system.

An other embodiment of the method and system according to the preamble is known from Best Case response time analysis for improved schedulability analysis of distributed real-time tasks (Proceedings ICDCS Workshop on Distributed Real-Time Systems, 2000, pages B14 to B20). Here, a best response time analysis method based upon RMA is disclosed. With the disclosed analysis method a lower bound on the best-case response time of a task is derived that takes into account the relative phase between tasks in the best case. The best case response time of a task occurs when it is least preempted by higher priority tasks and the execution time of the task is the minimum. For a task to be least preempted by higher priority tasks, it should be activated immediately after higher priority tasks have completed their execution in the best case and the next activation of higher priority tasks should occur as late as possible. The relative phase between a low and a high priority task is then defined by a next activation time of the higher priority task relative to an activation time of the lower priority task. However, the derived lower bound on the best-case response time is not tight.

An embodiment of the method according to the current invention is described in claim 2. By using, amongst others, the number of preemptions by a higher priority task times the best-case computation time of the higher priority task, the best-case response time of a low priority task can be determined.

An embodiment of the method according to the current invention is described in claim 3. By using an iterative procedure in which a resulting value of each iteration is at most equal to a resulting value of a previous iteration and that terminates when $BR_i(k+1)$ is substantially equal to $BR_i(k)$, the value of $BR_i(k+1)$ can be used for the best-case response time of the first periodic task.

An embodiment of the method according to the current invention is described in claim 4. By using the worst-case computation time of the first periodic task as a basis of the worst-case response time of the first periodic task, an upper bound for the best-case response time is found. This upper bound can be used as initialization value of the iterative procedure.

An embodiment of the method according to the current invention is described in claim 5. By using the best-case computation time of the first periodic task as a basis of the worst-case response time of the first periodic task, an upper bound for the best-case response time is found. This upper bound can be used as initialization value of the iterative procedure.

An embodiment of the method according to the current invention is described in claim 6. By taking into account the release jitter of the first periodic task for determination of the best-case response time of the first periodic task, a set of schedulable tasks can be determined better and the resulting resource utilization of the system can be improved.

A further object of another the invention is to provide a system that derives a tighter lower bound on the best-case response time of a task. To achieve this object, the system for determining a best-case response time of a first periodic task is characterized in that the system further comprises response time means conceived to determine that the best-case response time of the first periodic task is substantially equal to the difference between a start of the first periodic task right after its release and a completion of the first periodic task that coincides with a release of the second periodic task.

Embodiments of the system according to the invention are described in claims 8 to 10.

Embodiments of a storage device, a television set and a set-top box according to the invention are described in claims 12, 13 and 14 respectively.

The invention will be described by means of embodiments illustrated by the following drawings.

Nowadays, continuous media processing, such as is required for audio and video, is performed more and more by programmable components, rather than dedicated single-function components. One of the main performance issues in real-time computing systems is to determine whether or not a set of periodic tasks, like processing of video frames, can be processed on a resource, like a CPU, without exceeding their deadlines, using fixed-priority preemptive scheduling, such as Rate Monotonic Analysis (RMA). RMA is a collection of quantitative methods and algorithms that allow engineers to specify, analyze, and predict the timing behavior of real-time software systems. Some factors that are used in RMA calculations include a worst-case analysis of response times of a task and the priority levels associated with the execution of a task. The worst-case analysis of response times under arbitrary phasing can be derived as follows. Given a set of n tasks $\tau_1, \tau_2, \ldots, \tau_n$ and given for each task $\tau_i$ a period $T_i$ of activation and a worst-case computation time $WC_i$, the worst-case response time $WR_i$ of a task $\tau_i$ is given by the smallest positive value that satisfies the following recursive equation:

$$WR_i = WC_i + \sum_{j \in hp(i)} \left\lceil \frac{WR_i}{T_j} \right\rceil WC_j$$

Here, hp(i) denotes the set of tasks with a higher priority than $\tau_i$. The following iterative procedure can be used to calculate this worst-case response time:

$$WR_i(0) = WC_i$$

$$WR_i(k+1) = WC_i + \sum_{j \in hp(i)} \left\lceil \frac{WR_i(k)}{T_j} \right\rceil WC_j$$

wherein k=0, 1, . . .

The procedure stops when the same value is found for two successive iterations of k: $WR_i(k+1)=WR_i(k)$. Given these response times, it can be determined that the given set of tasks can be processed on the resource if the worst-case response time of each task does not exceed its deadline. The deadline of each task is assumed to be equal to its period. The procedure can also be stopped, when a task's deadline is exceeded. However, when a certain task triggers the next one in a distributed multiprocessor system then the jitter or time variation in the completion of the triggering task results in a release jitter of the following task, which in turn has an effect on the worst-case response times of other tasks. This jitter can also occur when tasks are organized as pipelines in which the output of a task serves as the input of a next task. In order to bound the jitter as tightly as possible, both the worst-case and best-case response times of the triggering task needs to be determined.

Figure 1:
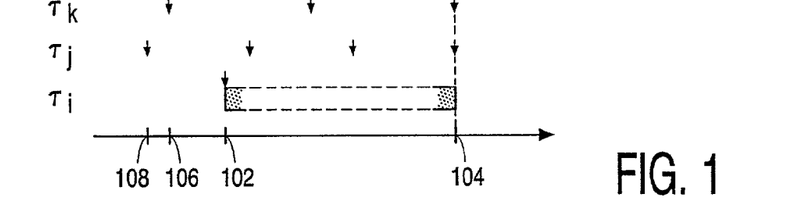
FIG. 1 illustrates an optimal instant for a task $\tau_i$.
Figure 2:
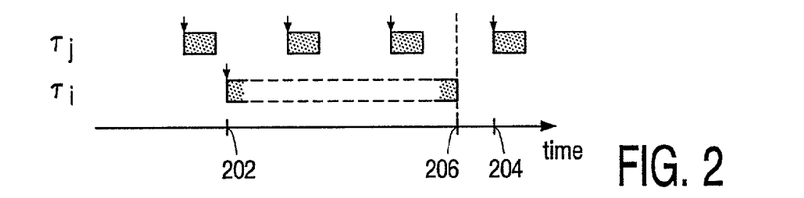
FIG. 2 illustrates a situation in which there's no optimal instant for a task $\tau_i$.

FIG. 1 illustrates an optimal instant for a task $\tau_i$. The optimal instant 104 indicates the execution of the task $\tau_i$ with best-case response time. It occurs whenever the phasings of the release times of the tasks $\tau_i$, $\tau_j$ and $\tau_k$ are such that the considered execution of $\tau_i$ starts right upon its release and its completion coincides with a simultaneous release for all higher priority tasks $\tau_j$ and $\tau_k$. Within FIG. 1, 102 is the release time of task $\tau_i$ according to the best-case response time of task, 108 is a release time of task $\tau_j$, 106 is a release time of task $\tau_k$ and 104 is the release time for all higher priority tasks $\tau_j$ and $\tau_k$ with which the completion of task $\tau_i$ coincides. In general, release times are indicated by an arrow ↓. This can be proven as follows: when the execution with best-case response time does not start right upon its release, its release can be shifted to the right, thereby decreasing the response time of the execution under consideration. Thus execution of task $\tau_i$ starts upon its release. Furthermore, if there is an execution of $\tau_i$ with best-case response time but where not all higher priority tasks have a simultaneous release at its completion, the phasings can be slightly altered without increasing the response time of the execution of $\tau_i$ under consideration. Consider such a situation, as illustrated in FIG. 2, where a higher priority task $\tau_j$ does not have a release indicated by time 204 coinciding with the completion time 206 of the execution of task $\tau_i$ under consideration. Now, as just before time 206 task $\tau_j$ is being processed, it is known that between time 206 and 204 no activity of task $\tau_j$ occurs, since otherwise there would be work pending of a higher priority task just before time 206. When the releases of task $\tau_j$ are shifted to the left by an amount of 204–206, no extra preemptions are shifted in from the right into the interval [202,206] spanned by the execution of task $\tau_i$. On the other hand, shifting the releases of task $\tau_j$ to the left may shift preemptions by task $\tau_j$ out of this interval on the left. As a result, the amount of preemption of task $\tau_i$ in interval [202,206] due to task $\tau_j$, as well as due to other tasks $\tau_k$, can only decrease or stay the same. Because an execution of $\tau_i$ with best-case response time was considered, only the latter can hold, and there is still a best-case response time for the execution of task $\tau_i$ under consideration. As derived above, the releases of all higher priority tasks can be shifted to the left to obtain an optimal instant.

A consequence of this is that whereas the highest concentration of executions of higher priority tasks is found right after their critical instant, their highest separation is found right before it.

The recursive equation for the best-case response times can be derived by looking back in time from the optimal instant of task $\tau_i$. The best-case response time $BR_i$ of a task $\tau_i$ is given by the largest value that satisfies $$BR_i = BC_i + \sum_{j \in hp(i)} \left( \left\lceil \frac{BR_i}{T_j} \right\rceil - 1 \right) BC_j \quad (1)$$

where $BC_j$ denotes the best-case computation time of a task $\tau_j$, $BC_i$ denotes the best-case computation time of task $\tau_i$ and hp(i) denotes the set of tasks with a higher priority than the priority of task $\tau_i$. It can be found by the following iterative procedure, which stops when the same value is found for two successive iterations of k:

$$BR_i(0) = WR_i \quad (2)$$

$$BR_i(k+1) = BC_i + \sum_{j \in hp(i)} \left( \left\lceil \frac{BR_i(k)}{T_j} \right\rceil - 1 \right) BC_j \quad (3)$$

Figure 3:
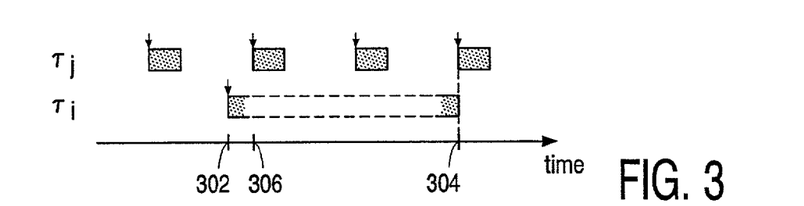
FIG. 3 illustrates preemptions of task $\tau_i$, by a higher priority task task $\tau_j$.

The proof hereof is illustrated by FIG. 3 in which the preemptions of a task $\tau_i$ by a higher priority task $\tau_j$ is considered given an optimal instant for the response time of task $\tau_i$. Now, as task $\tau_i$ is being processed just after its release time 302, no activity of task $\tau_j$ takes place between 302 and 306, since otherwise there would be work pending of a higher priority task at time 302. As a result, only the releases of task $\tau_j$ after time 302, i.e., the releases in the interval [306,304), preempt the execution of task $\tau_i$. The number of these preemptions is given by:

$$\left\lceil \frac{BR_i}{T_j} \right\rceil - 1$$

each of which gives a contribution $BC_j$ to the best-case response time of task $\tau_i$, resulting in the recursive equation (1). In order to have the tightest lower bound on the best-case response time, the largest value satisfying this equation is taken. Next, take an upper bound $BR_i(k)$ on the best-case response time of task $\tau_i$, and $BR_i(0) = WR_i$ is one, then $$\left\lceil \frac{BR_i(k)}{T_j} \right\rceil - 1$$

gives an upper bound on the number of preemptions by task $\tau_j$ in it, and thus $BR_i(k+1)$ as given in (3) gives a next upper bound on $BR_i$, which is at most equal to the previous upper bound. Upon termination, i.e., when $BR_i(k+1) = BR_i(k)$, it is known that the gaps left by higher priority tasks in the interval [302,304) in FIG. 3 are just enough for the best-case computation time $BC_i$. This, together with the fact that task $\tau_i$ is being executed in the first part as well as the last part of the interval [302,304), shows that the best-case response time cannot be smaller than the found value.

In order to get a better initialization value in (2), the worst-case response times based on worst-case computation times can be replaced by worst-case response times based on best-case computation times.

Figure 4:
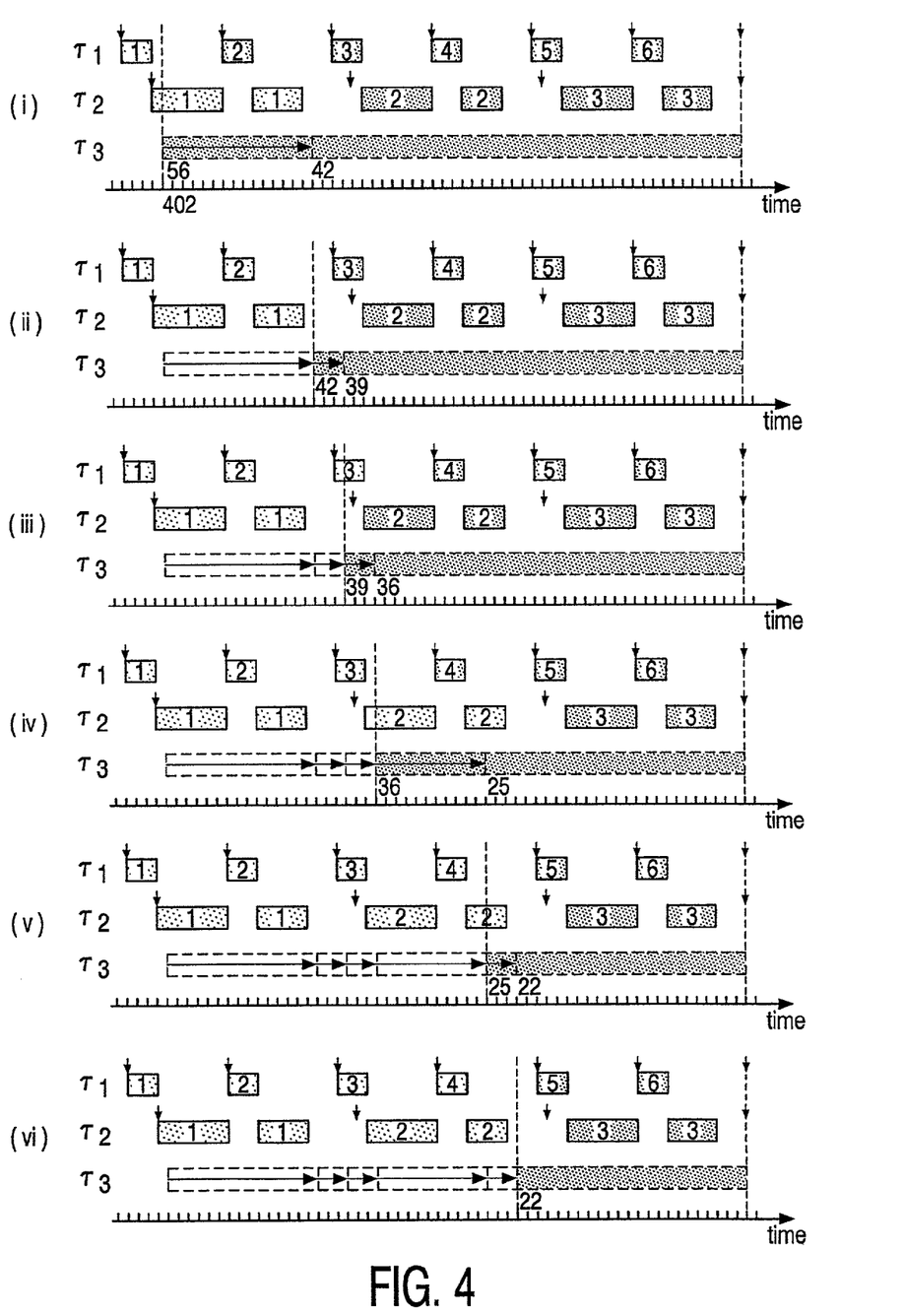
FIG. 4 illustrates iterations to determine the best-case response time of task $\tau_3$.

FIG. 4 illustrates the iterations to determine the best-case response time of a task $\tau_3$ according to the example as given in Table 1, where the tasks are given in order of decreasing priority:

TABLE 1

| Task | Period | Computation Time | Worst-case Response time | Best-case response time |
|---|---|---|---|---|
| $\tau_1$ | 10 | 3 | 3 | 3 |
| $\tau_2$ | 19 | 11 | 17 | 14 |
| $\tau_3$ | 56 | 5 | 56 | 22 |

In this example, best-case computation times are equal to worst-case computation times and within FIG. 4, the executions are numbered for ease of reference. As illustrated in FIG. 4, the initial upper bound $BR_3(0) = 56$, indicated by 402, falls inside the period of execution 1 of $\tau_1$ and the period of execution 1 of $\tau_2$. As a result it can be concluded that these executions do not preempt the execution of $\tau_3$ so the preemptions can at most contain executions 2 to 6 of $\tau_1$ and executions 2 to 3 of $\tau_2$, resulting in a new upper bound of:

$$BR_3(1) = BC_3 + \sum_{j \in hp(i)} \left( \left\lceil \frac{BR_3(0)}{T_j} \right\rceil - 1 \right) BC_j$$

$$BR_3(1) = 5 + \left( \left\lceil \frac{56}{10} \right\rceil - 1 \right) 3 + \left( \left\lceil \frac{56}{19} \right\rceil - 1 \right) 11$$

$$BR_3(1) = 5 + 5*3 + 4*11 = 42.$$

Figure 5:
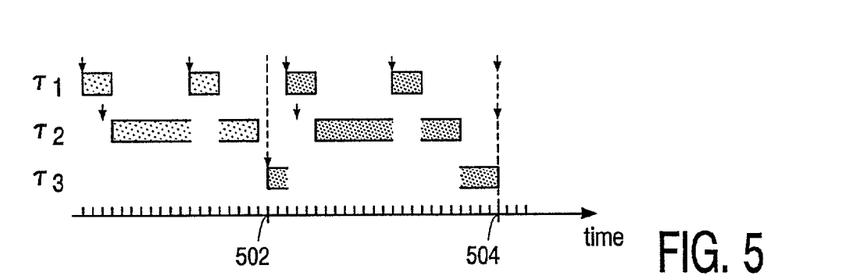
FIG. 5 illustrates the computed best-case response time of task $\tau_3$.

Next, in iteration (ii), we see that execution 2 of $\tau_1$ also does not preempt the execution of $\tau_3$, so the preemptions can at most contain executions 3 to 6 of $\tau_1$ and executions 2 to 3 of $\tau_2$, resulting in a new upper bound of $BR_3(2) = 5 + 4*3 + 2*11 = 39$. This continues up to iteration (vi). There, we see that executions 5 and 6 of $\tau_1$ and execution 3 of $\tau_2$ preempt the best-case execution of $\tau_3$, resulting in $BR_3(6) = 5 + 2*3 + 1*11 = 22 = BR_3(5)$, and the iterations stop. So, the best-case response time is 22, of which the execution and preemptions are illustrated in FIG. 5. Here, time 502 is the release and start of execution of $\tau_3$, and time 504 is the end time of execution of $\tau_3$. The difference between time 502 and time 504 is the best-case response time of 22.

As is shown, a best-case execution time of a task contains preemptions by higher priority tasks. Furthermore, some executions of higher priority tasks may themselves be postponed due to even higher priority tasks, moving the former ones into the interval of the best-case execution of the considered task. This happens in the above described example, that starts with an upper bound on the best-case response time that is gradually reduced and in which the preemption-caused preemptions are included.

Given the worst-case and best-case response times of a task $\tau_i$, the completion jitter $CJ_i$ of it can be calculated, i.e., the variation in the completion times of its executions as compared to a strict periodic pattern, with period $T_i$. If $\tau_i$ is released strictly periodically, the jitter is given by the difference between the worst-case and best-case response time:

$$CJ_i = WR_i - BR_i$$

Figure 6:
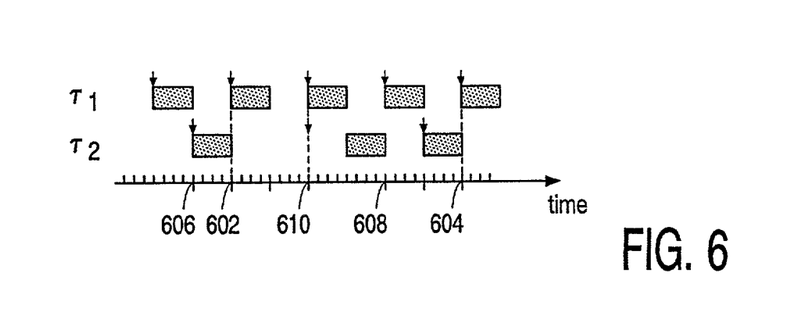
FIG. 6 illustrates a situation in which a best-case execution of task $\tau_2$ is directly succeeded by a worst-case execution.

Concerning completion jitter, note that there exist situations in which an execution of a task having best-case response time may directly be succeeded by an execution having worst-case response time, and vice versa. An example of this is given in FIG. 6 where there are two tasks, $\tau_1$ and $\tau_2$, $\tau_1$ having higher priority than $\tau_2$, with periods $T_1=8$, $T_2=12$, computation times $WC_1=BC_1=WC_2=BC_2=4$. For this example, the best-case and worst-case response times of $\tau_2$ are $BR_2$=time 602−time 606=4 and $WR_2$=time 608−time 610=8, respectively. Furthermore, FIG. 6 illustrates that they indeed can occur right after each other. The completion jitter of $\tau_2$ equals $CJ_2=WR_2-BR_2=8-4=4$. Within FIG. 6, times 602 and 604 indicate optimal instants for $\tau_2$.

In case of release jitter, worst-case response times are derived as described below. Within FIG. 6, time 610 indicates a critical instant in which the start of the period of the higher priority task $\tau_1$ coincides with the start of the period of the lower priority task $\tau_2$. The possibility that the jitter of a higher priority task $\tau_j$ occurs between the release at the critical instant and its next release, leading to a time between its first two releases that equals $T_j - RJ_j$, wherein $RJ_j$ is the release jitter of task $\tau_j$. Considering the worst-case number of preemptions over a time interval of length t then is similar to considering the preemptions of $\tau_j$ as if it were strictly periodic, over a time interval of length $t+RJ_j$, and so the resulting worst-case response times are computed as follows:

$$WR_i(0) = WC_i$$

$$WR_i(k+1) = WC_i + \sum_{j \in hp(i)} \left\lceil \frac{WR_i(k) - RJ_j}{T_j} \right\rceil WC_j$$

wherein k=0, 1, . . .

The effect of release jitter on the analysis of best-case response times is described below. Now consider the possibility that the jitter of a higher priority task $\tau_j$ occurs between the release at an optimal instant and its previous release, leading to a $T_j + RJ_j$ between these two releases. In turn, to determine the best-case number of preemptions of a task $\tau_j$ over a time interval of length t then is similar to considering the preemptions of $\tau_j$ as if it were strictly periodic, over a time interval of length $t - RJ_j$, and so the resulting best-case response times are computed as follows:

$$BR_i(0) = WR_i$$

$$BR_i(k+1) = BC_i + \sum_{j \in hp(i)} \left( \left\lceil \frac{BR_i(k) - R_j}{T_j} \right\rceil - 1 \right)^+ BC_j$$

wherein k=0,1, . . . and the notation x+ stands for the maximum of 0 and x: max{0,x}, which is used to indicate that the number of preemptions cannot be negative.

Given the worst-case and best-case response times of a task $\tau_i$ as well as its release jitter, its completion jitter $CJ_i$ is now given by:

$$CJ_i = RJ_i + WR_i - BR_i \quad (4)$$

Figure 7:
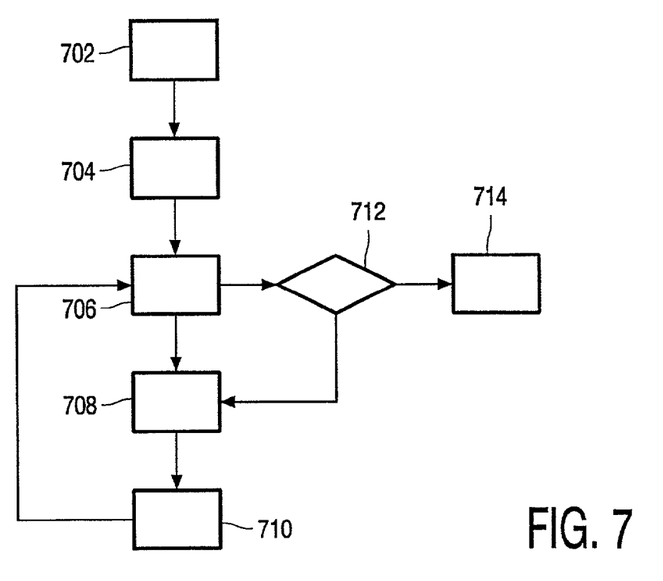
FIG. 7 illustrates the main steps of a method according to the invention.

FIG. 7 illustrates the main steps of a method according to the invention that takes the effect of jitter into account in a distributed multiprocessor system with task dependencies, where the completion of a task may trigger the release of a following task. Within step 702 the priorities of all tasks $\tau_i$ are determined after which within step 704, the release jitter of all tasks is set to 0: $RJ_j=0$. Within step 706, the best-case response time and the worst-case response time, taking this release jitter into account, is calculated for all tasks for each processor on which a task may run. Within step 708, the completion jitter of each task as given by (4) is calculated. Next, within step 710, the release jitter of each task that is triggered by another task is updated by making it equal to the completion jitter of the triggering task. The resulting release jitters of all tasks is then used again within step 706 to calculate the best-case response times and worst-case response times. Within step 712, it is determined whether the best-case response times and worst-case response times do not change anymore, or if the response times exceed the deadlines of the tasks. When either of the stop criteria is valid, the final step 714 is reached. When non of the stop criteria is valid, the method continues with step 708. During the above method, the jitters and the worst-case response times increase, and the best-case response times decrease, causing again the jitters to increase etc., so eventually the method terminates. Furthermore, this shows that if we redetermine the worst-case and best-case response times for new estimates of the release jitter, we can use their final values of the previous iteration for initialization.

The order in the described embodiment of the method of the current invention is not mandatory, a person skilled in the art may change the order of steps or perform steps concurrently using threading models, multi-processor systems or multiple processes without departing from the concept as intended by the current invention.

Figure 8:
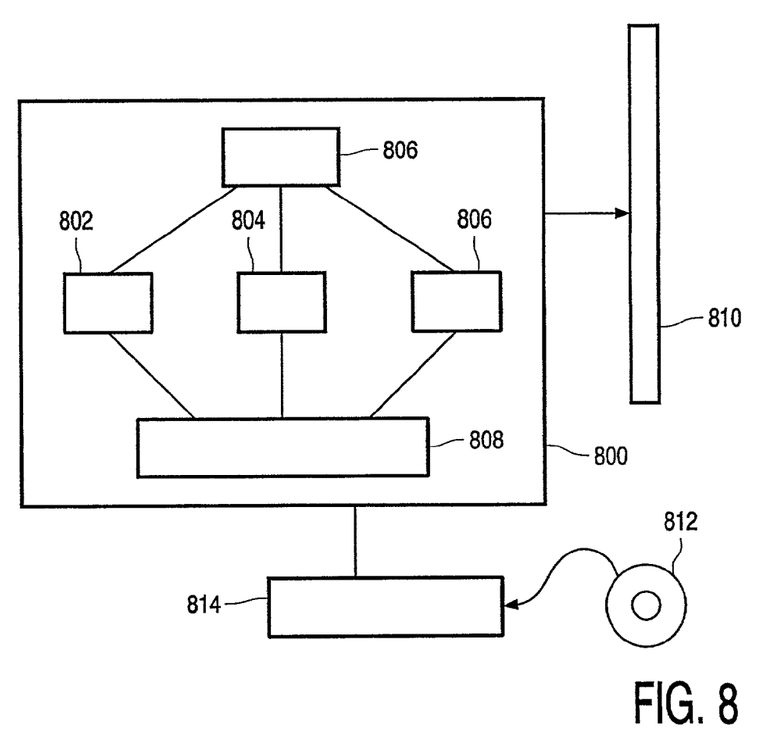
FIG. 8 illustrates the most important parts of an embodiment of the system.

FIG. 8 illustrates the most important parts of an embodiment of the system according to the invention in a schematic way. The system 800 comprises a first memory 802 having first computer-readable code embedded therein for calculating the best-case response time $BR_i$ of a task $\tau_i$ according to the following formula:

$$BR_i = BC_i + \sum_{j \in hp(i)} \left( \left\lceil \frac{BR_i}{T_j} \right\rceil - 1 \right) BC_j$$

wherein $BC_i$ denotes a best-case computation time of a periodic task $\tau_i$, hp(i) denotes a set of tasks with a higher priority than the priority of task $\tau_i$ and $T_j$ denotes a period of activation of a task j of hp(i). The priority of each task, the processor on which each task is executed and the resource a task uses is stored into lookup table 808. The tasks may also be executed on a distributed system. This is the case when, for example a multi-media terminal that shows images is used for which the processing of images that require intensive computing power is performed on a server and the less intensive processing is performed on the multi-media terminal itself. Resources are CPU clock cycles, disk-drive, network bandwidth, memory etc. Second memory 804 has second computer readable code embedded therein for calculating the previously mentioned best-case response time $BR_i$ according to the following iterative formula:

$$BR_i(0) = WR_i$$

$$BR_i(k+1) = BC_i + \sum_{j \in hp(i)} \left( \left\lceil \frac{BR_i(k)}{T_j} \right\rceil - 1 \right) BC_j$$

wherein k=0, 1, . . . This calculation is performed for each task that has to be scheduled on the system. A task is for example decoding an image frame or applying image enhancement upon the decoded frame. Priorities of applications or tasks depend upon the viewer or urgency of the application. An image window in the corner of the television screen monitoring a sleeping baby has a lower priority than an image window showing the movie the parents want to see. However, when the image windows shows irregularities in the heart beat of the sleeping baby, the priority is higher than that of the image window showing the movie. In order to determine whether the set of tasks can be scheduled on the system 800, both best case response times and worst case response times as previously described must be calculated. When no task exceeds its deadline, the set of tasks can be scheduled and executed on the system. When tasks depend upon each other because the completion of a task triggers the release of a following task, which is the case in pipeline architectures, the variation in the completion times of the executions of a task must be taken into account. This so-called jitter effect on the best-case response time is calculated by third computer-readable code embedded within third memory 806. The calculations are performed according to the following iterative formula:

$$BR_i(0) = WR_i$$

$$BR_i(k+1) = BC_i + \sum_{j \in hp(i)} \left( \left\lceil \frac{BR_i(k) - RJ_j}{T_j} \right\rceil - 1 \right)^+ BC_j$$

wherein $RJ_j$ denotes the release jitter of the first periodic task $\tau_i$, and $x^+$ denotes the maximum of 0 and x. All computer-readable code is executed by host processor 806. This system 800 is realized in software intended to be operated as an application by a computer or any other standard architecture able to operate software. The system can be used to operate a digital television set 810. The software can also be updated from a storage device 812 that comprises a computer program product arranged to perform the method according to the invention. The storage device is read by a CD reader 814 that is connected to the system 800.

Figure 9:
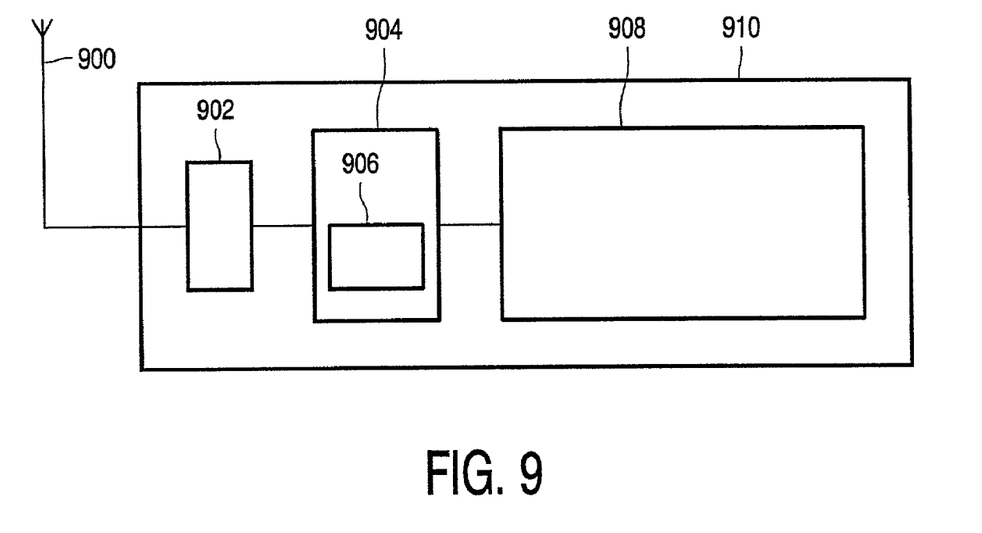
FIG. 9 illustrates, in a schematic way, the most important parts of a television set that comprises an embodiment of the system according to the invention.

FIG. 9 illustrates, in a schematic way, the most important parts of a television set 910 that comprises an embodiment of the system according to the invention. Here an antenna, 900 receives a television signal. The antenna may also be for example a satellite dish. Furthermore, any other device like for example cable, storage device, internet or Ethernet may be used to receive a television signal. A receiver, 902 receives the signal. The signal may be for example digital, analogue, RGB or YUV. Besides the receiver 902, the television set contains a programmable component, 904, for example a programmable integrated circuit. This programmable component contains a system according to the invention 906. A television screen 908 shows images that are received by the receiver 902 and are processed by the programmable component 904, the system according to the invention 906 and other parts that are normally contained in a television set, but are not shown here.

Figure 10:
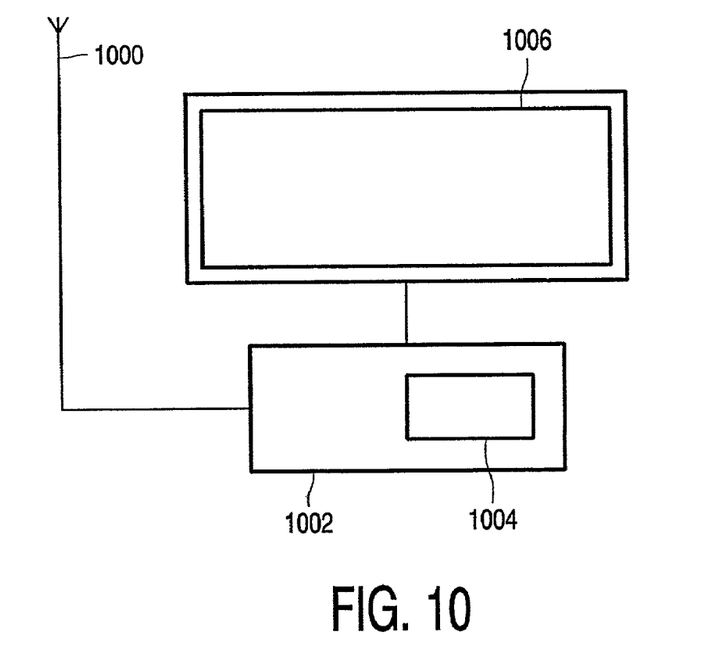
FIG. 10 illustrates, in a schematic way, the most important parts of a set-top box that comprises an embodiment of the system according to the invention.

FIG. 10 illustrates, in a schematic way, the most important parts of a set-top box that comprises an embodiment of the system according to the invention. Here, an antenna 1000 receives a television signal. The antenna may also be for example a satellite dish, cable, storage device, internet, Ethernet or any other device able to receive a television signal. A set-top box 1002, receives the signal. The signal may be for example digital, analogue, RGB or YUV. Besides the usual parts that are contained in a set-top box, but are not shown here, the set-top box contains a system according to the invention 1004. The television set 1006 can show the output signal generated from a received signal by the set-top box. Since the output signal of the set-top box is used as the input signal for the television set, the release jitter of the output signal determines the input jitter of the input signal for the television set. Therefore, the best-case response time and worst-case response time of the input signal is used to determine if the input signal can be processed by the television set. The output signal may also be directed to a storage device like a VCR, DVD-RW or a harddisk or they may be directed to an internet link in stead of being directed to the television set.

The invention claimed is:

1. A method for determining a best-case response time of a first periodic task, the method comprising the acts of:
   determining that the first periodic task performed within the device has a lower priority than a higher priority of a second periodic task,
   determining the best-case response time of the first periodic task as being substantially equal to the difference between a start of the first periodic task and a completion of the first periodic task, the start being right after a release of the first periodic task and the completion coinciding with a release of the second periodic task, and
   outputting the best-case response time, wherein the best-case response time of the first periodic task $BR_i$ is substantially equal to the largest value that satisfies:

$$BC_i + \sum_{j \in hp(i)} \left( \left\lceil \frac{BR_i}{T_j} \right\rceil - 1 \right) BC_j$$

wherein $BC_i$ denotes a best-case computation time of the first periodic task $\tau_i$, hp(i) denotes a set of tasks with a higher priority than the lower priority, and $T_j$ denotes a period of activation of a task j of hp(i).

2. The method of determining a best-case response time of a first periodic task according to claim 1, wherein $WR_i$ denotes a worst-case response time of the first periodic task $\tau_i$ and the best-case response time $BR_i$ can be found by an iterative procedure of k iterations, where k =0, 1, . . . comprising:

$$BR_i(0) = WR_i$$

$$BR_i(k+1) = BC_i + \sum_{j \in hp(i)} \left( \left\lceil \frac{BR_i(k)}{T_j} \right\rceil - 1 \right) BC_j$$

wherein the iterative procedure terminates when the same value is found for two successive iterations of k.

3. The method of determining a best-case response time of a first periodic task according to claim 2, wherein the worst-case response time of the first periodic task is based upon a worst-case computation time of the first periodic task.

4. The method of determining a best-case response time of a first periodic task according to claim 2, wherein the worst-case response time of the first periodic task is based upon a best-case computation time of the first periodic task.

5. The method of determining a best-case response time of a first periodic task according to claim 2, wherein $RJ_i$ denotes a release jitter of the first periodic task $\tau_i$, the release jitter being a variation in the release of the first periodic task and the release jitter having a negative contribution to the best-case response time:

$$BR_i(0)=WR_i$$

$$BR_i(k+1) = BC_i + \sum_{j \in hp(i)} \left( \left\lceil \frac{BR_i(k) - RJ_j}{T_j} \right\rceil - 1 \right)^+ BC_j$$

wherein $x^+$ denotes the maximum of 0 and x.

6. A computer readable medium storing a computer program when executed arranged to perform the method according to claim 1.

7. A set-top box comprising a processor arranged to perform the method according to claim 1 wherein the processor is configured to determine from the best-case response time of the first periodic task and a worst case response time of the first periodic task if a signal can be used by the set-top box.

8. A television set comprising a processor arranged to perform the method according to claim 1 wherein the processor is configured to determine from the best-case response time of the first periodic task and a worst case response time of the first periodic task if a signal can be used by the television set.

9. The method of claim 1, wherein the first determining act determines that the first periodic task has the lower priority than a plurality of other tasks, and the second determining act determines that the best-case response time of the first periodic task is substantially equal to the difference between the start of the first periodic task and the completion of the first periodic task, the start being right after the release of the first periodic task and the completion coinciding with a release of the plurality of other periodic tasks.

10. A system for determining a best-case response time of a first periodic task, the system comprising a processor configured to:
 determine that the first periodic task has a lower priority than a higher priority of a second periodic task,
 determine that the best-case response time of the first periodic task is substantially equal to the difference between a start of the first periodic task right after its release and a completion of the first periodic task that coincides with a release of the second periodic task, and
 calculate and output the best-case response time of the first periodic task $BR_i$ according to the following formula:

$$BR_i = BC_i + \sum_{j \in hp(i)} \left( \left\lceil \frac{BR_i}{T_j} \right\rceil - 1 \right) BC_j$$

wherein $BC_i$ denotes a best-case computation time of the first periodic task 96, hp(i) denotes a set of basics with a higher priority than the priority of the first periodic task, and $T_j$ denotes a period of activation of a task j of hp(i).

11. The system of determining a best-case response time of a first periodic task according to claim 10, wherein the processor is further configured to calculate the best-case response time $BR_i$ according to the following iterative procedure of k iterations, where k =0,1, . . . :

$$BR_i(0)=WR_i$$

$$BR_i(k+1) = BC_i + \sum_{j \in hp(i)} \left( \left\lceil \frac{BR_i(k)}{T_j} \right\rceil - 1 \right) BC_j$$

wherein $WR_i$ denotes a worst-case response time of the first periodic task $\tau_j$ and the iterative procedure terminates when the same value is found for two successive iterations of k.

12. The system of determining a best-case response time of a first periodic task according to claim 10, wherein the processor is further configured to calculate the best-case response time $BR_i$ corrected for a release jitter, the release jitter being a variation in the release of the first periodic task:

$$BR_i(0)=WR_i$$

$$BR_i(k+1) = BC_i + \sum_{j \in hp(i)} \left( \left\lceil \frac{BR_i(k) - RJ_j}{T_j} \right\rceil - 1 \right)^+ BC_j$$

wherein $RJ_i$ denotes the release jitter of the first periodic task $\tau_i$ and $x^+$ denotes the maximum of 0 and x.

13. A television set comprising the system according to claim 10.

14. The television set of claim 13 wherein the processor is further configured to determine from the best-case response time of the first periodic task and a worst case response time of the first periodic task if a signal can be used by the system.

15. A set-top box comprising the system according to claim 10.

16. The set-top box of claim 15 wherein the processor is further configured to determine from the best-case response time of the first periodic task and a worst case response time of the first periodic task if a signal can be used by the system.

17. The system of claim 10, wherein the processor is further configured to determine that the first periodic task has the lower priority than a plurality of other tasks, and that the best-case response time of the first periodic task is substantially equal to the difference between the start of the first periodic task and the completion of the first periodic task, the start being right after the release of the first periodic task and the completion coinciding with a release of the plurality of other periodic tasks.

* * * * *